May 25, 1965
H. R. DZIEDZIC ETAL
3,185,494
LATCH MECHANISM
Filed May 25, 1962
3 Sheets-Sheet 1
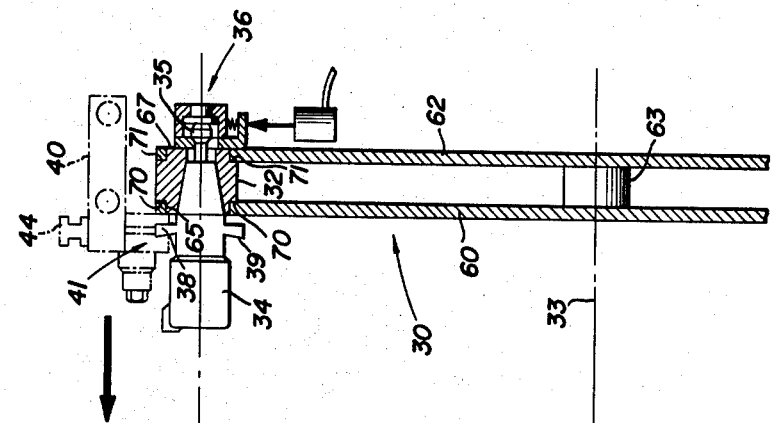
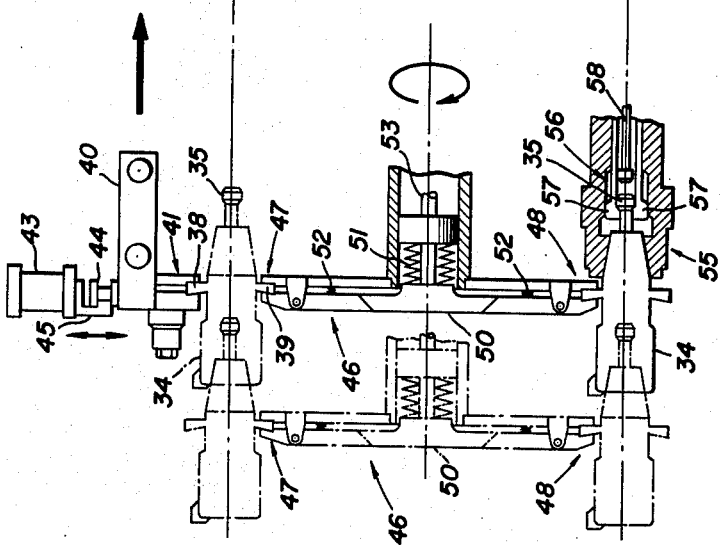
FIG. I
INVENTORS
HARRY R. DZIEDZIC
EDWARD M. ALISAUSKIS
BY Brown, Jackson
Boettcher & Dienner
ATTYS.

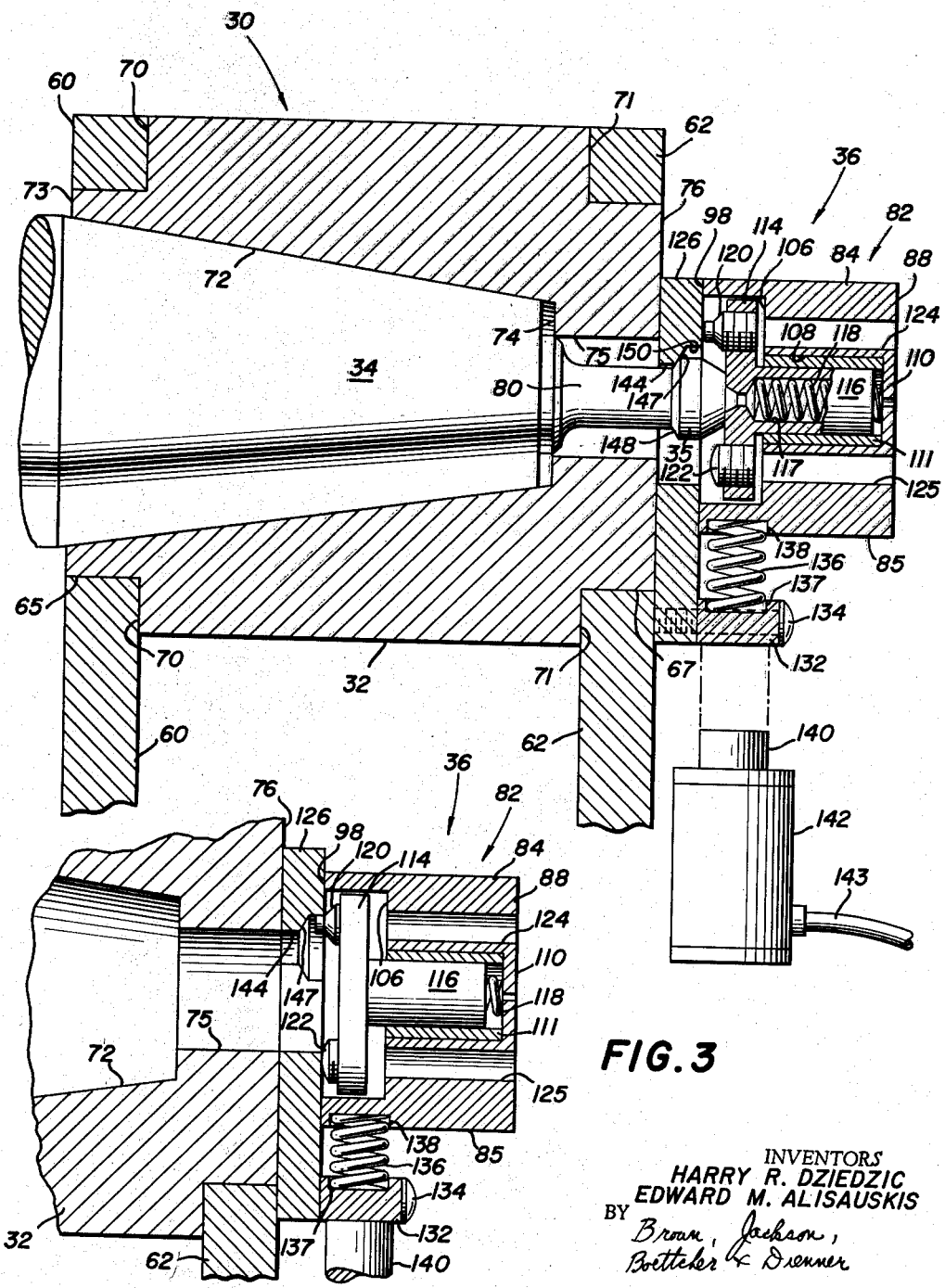

May 25, 1965

H. R. DZIEDZIC ETAL 3,185,494

LATCH MECHANISM

Filed May 25, 1962

INVENTORS
HARRY R. DZIEDZIC
EDWARD M. ALISAUSKIS
BY
Brown, Jackson, Boettcher & Dienner

ATTYS.

3,185,494
LATCH MECHANISM
Harry R. Dziedzic, Glenview, and Edward M. Alisauskis, Berwyn, Ill., assignors to Scully-Anthony Corporation, La Grange, Ill., a corporation of Illinois
Filed May 25, 1962, Ser. No. 197,745
12 Claims. (Cl. 279—89)

The present invention relates to a spring loaded latch mechanism of a type adapted to be held in open position until tripped by engagement with a projecting portion on a member to be held whereupon a locking member will be released and thereupon moved by a suitable spring or the like into locking engagement with the projecting portion.

The latch mechanism of the present invention is suited for numerous and varied applications, and is particularly suited for use in conjunction with tool storage apparatus as a means for holding a tool or tool holder in a socket provided therefor in a storage member. In this respect, the present invention may be used to advantage in conjunction with automatic tool changing apparatus of the type described in the co-pending application of Myron L. Anthony and Bernard R. Better, entitled "Apparatus and Method for Automatic Tool Changing," Serial No. 178,-060, filed March 7, 1962, which application is assigned to the assignee of the present invention. The use of the invention in an automatic tool changing system, and in particular as an element of a tool storage matrix, will be described more fully hereinafter.

This invention also pertains to the provision of projecting means on a tool or tool holder which means is adapted to cooperate with the above-mentioned latch mechanism and also with apparatus such as an automatic draw bar mechanism which may be provided in an associated machine tool spindle.

One object of the present invention is to provide a latch mechanism in conjunction with socket means whereby a member to be held may be supported in a corresponding socket and retained therein by said latch mechanism.

A further object of the invention is to provide a latching mechanism in conjunction with a tool storage matrix member having a plurality of tool sockets and being of a type used in automatic tool changing systems whereby a tool inserted in an empty socket in the matrix will be automatically locked therein by a latching mechanism associated with the socket until external force is applied to said mechanism to release the same.

Another of our objects is to provide a latching mechanism which is adapted to be actuated to open position by application of external force thereto and to be held in that position after removal of the force and until tripped by engagement with a member to be held whereupon a clamp member is automatically moved to locking position.

Still another object of the invention is to provide projecting means on a tool holder or the like which means is adapted to cooperate both with a latching mechanism associated with a tool storage member and also with a draw bar mechanism which may be provided in a spindle of an associated machine tool.

Other objects, uses and advantages of the invention will become apparent, or be obvious, from the following specification, particularly when considered in connection with the drawings in which:

FIGURE 1 is a generally schematic side elevational view of an automatic tool changing system illustrating, by way of example, one suitable application of the latch mechanism and related tool holder projecting means of the invention;

FIGURE 2 is a fragmentary vertical sectional view showing a latch mechanism embodying the present invention mounted at the rear of a tool storage matrix member in axial alignment with a tool socket provided in the matrix, and further showing the tapered rear end portion of a tool holder which is positioned in the socket and held therein through cooperation between the latch mechanism and a rearwardly projecting knob on the tool holder;

FIGURE 3 is a fragmentary view similar to FIGURE 2 showing the latch mechanism in released position and the tool holder removed from the socket;

Figure 4:
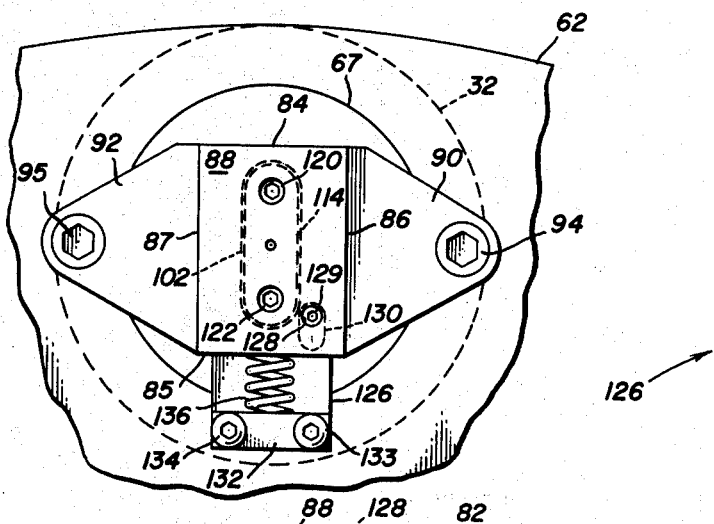
FIGURE 4 is a rear elevational view, partly broken away, of the structure of FIGURE 2.

Referring now to the drawings, reference is first made to FIGURE 1, since it is believed that a general description of the tool changing system represented therein will be useful in understanding the advantages of the latch mechanism of the present invention, which will itself be described in detail hereinafter. It should be understood, however, that the present invention is not limited to use in conjunction with tool storage means or to use in conjunction with automatic tool changing systems.

FIGURE 1 is a side elevational view, substantially schematic in form, showing at 30 a fragmentary portion of a matrix or tool storage member, which may for example comprise a large circular disc-shaped member having a plurality of circumferentially spaced sockets, one of which is shown at 32. The matrix 30 may be rotatable about a horizontal axis 33 so as to position any one of the sockets 32 in a predetermined position for insertion or removal of a tool.

A tool holder 34 having a knob 35 projecting from its rear end is shown seated in the socket 32 and held therein by a latch mechanism in accordance with the present invention, the latch mechanism being indicated generally at 36 and being shown only schematically in FIGURE 1. The latch mechanism 36 cooperates with the knob 35 to lock the tool holder 34 in the socket. It will be understood that a large number of tools may be stored in the matrix 30 for transfer when needed to a work station such as a machine tool spindle or to an intermediate station or shuttle mechanism.

The tool holder 34 is provided with an upper flange portion 38 and a lower flange portion 39, and a movable shuttle member 40 is provided with gripper jaws 41, the latter being shown clamped on the opposite faces of the upper flange portion 38. The shuttle 40 is shown in dash lines in its extreme right hand position, and is shown in solid lines in its extreme left hand position, the shuttle being movable from one of said positions to the other along guide rails by a chain drive or other suitable drive means (not shown). A double acting cylinder 43 is provided for raising and lowering the gripper 41 of the shuttle when the latter is in its extreme left hand position where a lug 44 on the gripper is engaged by a hook 45 provided at the lower end of a piston which is reciprocable within the cylinder 43. Gripping member 41 is thus moved upwardly and downwardly within the shuttle in a guideway (not shown).

A transfer arm indicated generally at 46 is shown in its right hand position in solid lines and in its left hand position in dash lines, said arm being movable axially through a short stroke, and also being rotatable about its horizontal axis. The transfer arm 46 is provided with gripping jaws 47 and 48 at its respective ends, these jaws being biased to closed positions by an actuator 50 and a compression spring 51. Tension springs 52 are provided to open the jaws when a draw bar 53 which is connected to the actuator 50 is moved rearwardly by hydraulic or other suitable actuating means (not shown).

A spindle of a machine tool is indicated generally at 55, and an automatic draw bar mechanism for drawing a tool into the spindle is shown at 56, the latter means including a plurality of gripping fingers 57 adapted to engage the knob 35 upon movement of the fingers axially rearwardly by actuating means (not shown). An ejector rod 58 is axially movable with the fingers 57, whereby when said fingers are moved forwardly to release a tool holder 34, the rod 58 will butt the rear face of the knob 35 and aid in the removal of the holder 34 from the spindle.

By way of example, a sequence of operations for the tool changing system represented in FIGURE 1 will now be described. It will be assumed that a tool 34 is in the spindle 55, and that it is desired to return this tool to the matrix 30 and to transport another tool from the matrix to the spindle for a further machining operation. It will also be assumed that the shuttle 40 is in its extreme right hand position with the shutter gripper jaws 41 open. Thus, the matrix 30 is indexed or rotated until a selected tool is positioned with its flange portion 38 disposed between the open shuttle jaws 41, after which the matrix is stopped. The foregoing operation may be controlled by automatic control means which do not form a part of the present invention, and thus will not be described herein.

Once a selected tool is positioned with its flange portion 38 between the shuttle jaws 41, the shuttle jaws are closed and the tool is released in the matrix by actuation of the latch mechanism 36 (as will be described more fully hereinafter), after which the shuttle 40 is moved to its extreme left hand position. During the foregoing operations, the transfer arm 46 will normally be in a neutral position, i.e., it will be in its right hand position and will be rotated 90 degrees from the position shown in FIGURE 1 so as to extend substantially horizontally. If desired, the neutral position may be other than horizontal, as long as it is rotated sufficiently from the position of FIGURE 1 to avoid interference with a tool which is being brought forward by the shuttle 40. It will thus be seen that a tool is selected from the matrix 30 and transferred to an intermediate station from which it may be transported to the spindle 55.

The operations thus far described may be performed while a tool in the spindle is engaged in a machining operation, in which case the new tool is simply held at the intermediate stage by the shuttle jaws 41 until the spindle 55 is stopped.

With the shuttle 40 in its left hand position with a newly-selected tool gripped in its jaws, and with the spindle 55 stopped, the transfer arm jaws 47 and 48 are opened and the transfer arm is rotated from its neutral position to a vertical position whereby the jaws 47 will encompass the lowermost flange portion 39 on the newly-selected tool, and the jaws 48 will encompass the uppermost flange portion on the tool which is disposed in the spindle 55, after which the transfer arm jaws are closed. The jaws of the shuttle gripper 41 are then opened and the gripper is raised by the cylinder 43.

Once the shuttle gripper 41 has been moved upwardly, or otherwise moved away from the adjacent tool holder, the draw bar mechanism 56 is actuated to release the tool in the spindle 55, and the transfer arm 46 is moved axially to the left an amount sufficient to remove the old tool from the spindle, the ejector rod 58 aiding in the ejection of the old tool by being moved to the left to butt against the knob 35 thereon. The transfer arm 46 is then rotated 180 degrees and returned to its right hand position whereby the newly selected tool is inserted in the spindle, after which the draw bar mechanism 56 is actuated to pull in the new tool, and the shuttle gripper jaws 41 are lowered and closed about the upper flange portion on the tool which has been removed from the spindle.

Having thus inserted a new tool in the spindle 55 and removed the old tool therefrom, the transfer arm jaws 47 and 48 are opened, and the transfer arm 46 is rotated from its vertical position to a neutral position. The shuttle 40 is then moved back to its right hand position so as to return the old tool to an empty socket 32 in the matrix or tool storage member 30, the tool being automatically locked in the socket by the latch mechanism 36, as will be described in greater detail hereinafter. The shuttle jaws 41 are then opened, after which the matrix may be indexed to search for the next tool to be transferred to the spindle.

Referring to FIGURES 1 and 2, the matrix or rotatable tool storage member 30 comprises a pair of parallel disc-shaped plates 60 and 62 (only a fragmentary portion of which is shown) supported on a hub or spindle member 63. A plurality of sockets 32 are arranged in a circle by being circumferentially spaced around the radially outer portion of the plates 60 and 62. Each socket 32 comprises a horizontally disposed cylindrical member having reduced diameter end portions 65 and 67, and each socket is positioned between the plates 60 and 62 so that its end portions project into corresponding holes provided therefor in the plates. A plurality of cap screws (not shown) extend axially through the plates 60 and 62 respectively and into annular shoulders 70 and 71 on the sockets so as to secure the plates thereto, whereby the sockets 32 serve to connect the parallel matrix plates and provide a rigid assembly.

The interior portion of the socket 32 comprises a tapered or frusto-conical bore 72 which extends from a front face 73 of the socket to an annular shoulder 74, and a reduced diameter bore 75 extends from the shoulder to a rear face 76 of the socket. FIGURE 2 shows a tapered rear end portion of a tool holder 34 seated in the socket 32, and it will be seen that the knob 35 is mounted on the end of a rod 80 which is threaded into the rear end of the tool holder 34 so as to extend rearwardly therefrom. The rod 80 is of such a length that the knob 35 on the tool holder projects rearwardly beyond the rear face 76 of the socket so as to be adapted to cooperate with the latch mechanism 36.

Figure 5:
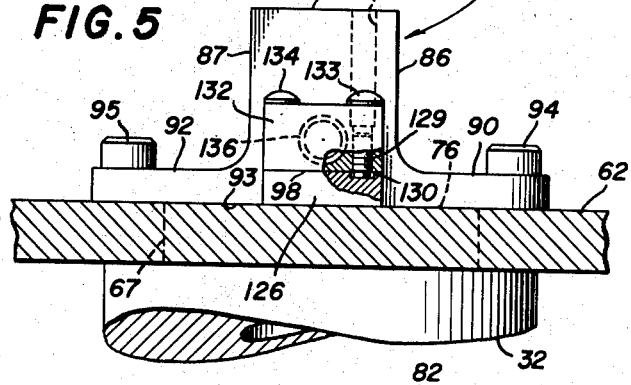
FIGURE 5 is a fragmentary bottom plan view, partly in section, of the structure of FIGURE 4.

The latch mechanism 36 will now be described, and it will be seen that it comprises a housing block 82 (shown best in FIGURES 2 and 6) having parallel flat top and bottom faces 84 annd 85 and parallel side faces 86 and 87, the rear face of the housing being indicated at 88. A pair of integral mounting lugs 90 and 92 (see FIGURES 4, 5 and 6) extend laterally outwardly adjacent a front face 93 of the housing and, as shown in FIGURE 5, a pair of cap screws 94 and 95 extend through the mounting lugs and into threaded engagement with the rear face of the matrix plate 62. It will thus be seen that the housing block 82 is secured to the rear of the matrix 30 so as to bear against the rear face 76 of the socket 32, and that the housing is mounted in substantial axial alignment with the reduced diameter socket bore 75 through which the knob 35 (on a tool holder inserted in the socket) is adapted to project.

Figure 6:
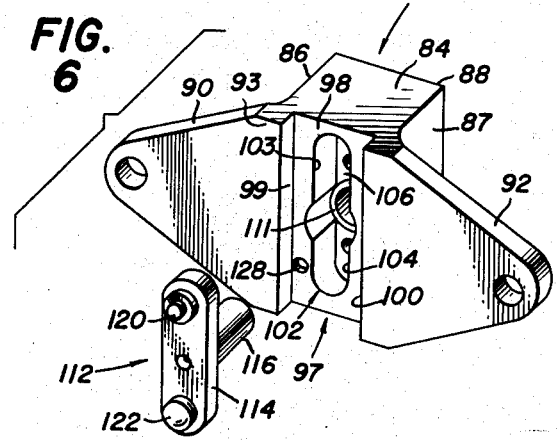
FIGURE 6 is an exploded perspective view of a housing block and a clamp trip member which is adapted to slide axially within the housing, said block and clamp trip member comprising components of the latch mechanism of FIGURE 2.

FIGURE 6 shows a vertical guide slot 97 which is formed in the front face 93 of the housing to accommodate a slidable clamp plate, as will be described more fully hereinafter. The guide slot 97 comprises a recessed back face 98 and side walls 99 and 100. In the recessed face 98 of the guide slot there is formed an oblong recess 102 having parallel side walls 103 and 104 and generally semi-circular top and bottom portions. The base of the recess 102 comprises a wall or face 106, and the housing block 82 is further provided with an axial bore 108 (see FIGURE 2) which extends from the face 106 and terminates a short distance from the rear face 88 of the housing so as to leave a relatively thin wall 110 therebetween. A bushing 111 is mounted in the bore 108.

A clamp trip member 112 (see FIGURES 2, 3 and 6) comprises an oblong trip plate 114 which is of a configuration similar to that of the recess 102 and is adapted to slide axially therein. The plate 114 has integral therewith a rearwardly extending cylindrical shaft 116 which is slidably received in the bushing 111. The shaft 116 has a bore 117 within which is housed a compression spring 118 whereby one end of the spring bears against the end of the bore 117 and the other end bears against the housing wall 110 so as to bias the trip member forwardly or out of the fixed housing 82.

The trip plate 114 has a half dog point set screw 120 threaded into a tapped hole provided therefor in the upper end of the plate, and an oval point set screw 122 is similarly threaded into a tapped hole provided in the lower portion of the plate. The set screws 120 and 122 are vertically aligned with one another and each projects forwardly from the front face of the plate. The amount by which they project may be adjusted by inserting a wrench through a corresponding one of the holes 124 and 125 which are provided in the housing block 82 for this purpose and which extend from the rear face 88 of the housing through to the face 106 at the rear of the recess 102.

As previously stated, the vertical guide slot 97 is provided to accommodate a clamp plate. FIGURE 5 shows the manner in which a clamp plate 126 is positioned within said slot so as to be adapted to slide vertically between the rear face 76 of the socket 31 and the base 98 of the guide slot. The housing block 82 is provided with a small diameter tapped bore 128 (see FIGURES 4, 5 and 6) which extends from the rear face 88 through to the face 98 so as to communicate with the guide slot 97. A set screw 129 is threaded in the bore 128 so as to project forwardly from the housing face 98 and into a vertical slot 130 provided in the rear of the clamp plate 126. In this manner, the vertical sliding movement of the clamp plate is limited by the length of the slot 130 formed therein, the plate being shown substantially in its lowermost position in FIGURE 2, and in a raised position in FIGURE 3.

A spring pad 132 is secured to the lower portion of the clamp plate 126 by a pair of cap screws 133 and 134, the pad being perpendicular to the plate 126 so as to extend rearwardly therefrom. A compression spring 136 is disposed vertically between the pad 132 and the underside 85 of the housing block, one end of the spring being seated in a counterbore 137 in the pad, and the other end being seated in a counterbore 138 formed in the underside of the block, whereby the spring will yieldingly urge the clamp plate 126 downwardly in the guide slot 97 toward a closed or locking position.

FIGURE 2 shows a piston 140 adapted to reciprocate vertically in a fixed cylinder 142. A hydraulic connection is shown at 143, and it will be understood that upon introduction of fluid under pressure into the cylinder 142, the piston will be actuated upwardly so as to engage the underside of the pad 132 and move the clamp plate 126 to its uppermost position as determined by engagement between the set screw 129 and the lower end of the slot 130. A solenoid or other suitable actuating means may of course be used in place of the hydraulic piston to lift the clamp plate, the purpose being to raise the latter against the force of the spring 136 so as to release the latch mechanism and permit removal of a member being held thereby, as will be more fully described hereinbelow.

Figure 7:
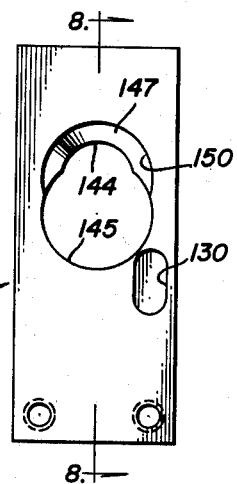
FIGURE 7 is a rear elevational detail view of a slidable clamp plate which comprises an element of the latch mechanism of FIGURE 2.
Figure 8:
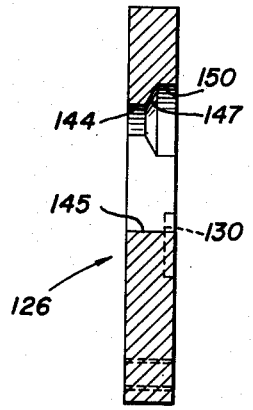
FIGURE 8 is a sectional view taken substantially along the line 8—8 of FIGURE 7.

Referring to FIGURES 2, 7 and 8, it will be seen that the clamp plate 126 is provided in its front face with a generally keyhole shaped opening comprising a small diameter upper bore 144 which is intersected by a larger diameter lower bore 145. The major portion of the larger bore 145 extends through the clamp plate at a constant diameter, while the upper bore 144 and a small portion of the bore 145 extend partly into the plate at a constant diameter and then are flared radially outwardly to form in effect a generally semi-circular tapered portion 147 having an inclination which corresponds substantially to the configuration of a frusto-conical shoulder 148 formed on the knob 35 carried by the tool holder 34. The tapered portion 147 terminates at a constant diameter portion 150 which extends through to the inner face of the clamp plate.

The operation of the latch mechanism 36 will now be described, and for purposes of illustration reference will again be made to the automatic tool changing system of FIGURE 1, as well as to FIGURES 2 and 3. FIGURE 2 shows a tool holder 34 held in the socket 32 by the latch mechanism, and it will be assumed that the matrix 30 has been indexed to position a selected tool holder with its flange portion 38 between the shuttle jaws 41, and that the shuttle jaws have been closed. In order to release the selected tool holder, control means (not shown) are actuated to cause fluid under pressure to be conducted to cylinder 142 through fluid connection 143, thus causing the piston 140 to be raised. The piston 140 bears against the underside of the pad 132 and raises the clamp plate 126 until the lower end of the slot 130 therein engages the set screw 129 in the housing. In this manner, the clamp plate is lifted an amount whereby the wall defining the smaller diameter bore 144 is above the frusto-conical shoulder 148 on the knob 35 so as to release the tool holder and permit it to be withdrawn from the socket 32. At this time the compression spring 118 will tend to eject the tool holder, but normally this spring is too small to cause any movement of the relatively heavy tool holder assembly.

Upon the release of the latch mechanism, the shuttle 40 is moved to its extreme left hand position withdrawing the tool holder from the socket and carrying it to a position where it can be transferred to the transfer arm 46, as previously described. When the tool holder 34 is thus withdrawn from the socket 32, the clamp trip 112 is moved axially forwardly by the spring 118 until the set screw 122 abuts the rear face of the raised clamp plate, as shown in FIGURE 3. Such forward movement of the clamp trip causes the upper set screw 120 thereon to project under the ledge 150 on the raised clamp plate, after which the pressure in the cylinder 142 is released and the clamp plate is lowered slightly until the ledge 150 bears against the end of the set screw 120.

It will be understood from the foregoing that upon withdrawal of a tool holder 34 from the socket, the clamp plate 126 is held in open position by the set screw 120, whereby the pressure in the cylinder 142 need not be maintained after the tool holder has been removed.

When the shuttle 40 is subsequently returned to its right hand position to return a tool to an empty socket 32 in the matrix 30, the tool is simply inserted in the socket until the knob 35 thereon engages the front face of the clamp trip plate 114 causing the latter to be moved rearwardly and releasing the clamp plate 126 which is then actuated downwardly by the spring 136 so as to engage the shoulder portion 148 in the manner shown in FIGURE 2. It should be noted that as the inclined or flared out portion 147 on the clamp plate engages the correspondingly inclined frusto-conical shoulder 148 on the knob 35 it will exert an axial pull thereon tending to draw the tool holder 34 further into the socket. It will be understood that when the present invention is utilized in conjunction with a tool storage matrix having a plurality of tool sockets therein, a latch mechanism of the type described may be associated with each socket in the matrix.

Another aspect of the invention relates to the provision on a tool holder of a projecting member such as the knob 35 which is adapted to cooperate both with one or more latch mechanisms associated with the matrix 30, and also with an automatic draw bar mechanism such as shown at 56 in FIGURE 1. In other words, when a tool holder 34 is inserted in the spindle 55, the fingers 57 are actuated radially inwardly and rearwardly to engage the knob 35 and pull the tool holder into a seated position in the spindle. Also, as described hereinabove, the same knob 35 cooperates with the clamp plate 126 and the clamp trip member 112 to permit locking of the tool holder in a socket 32 in the matrix.

It will be understood that the latch mechanism of the present invention is adapted to various useful applications other than in conjunction with tool storage means or in an automatic tool changing system. Thus, while certain preferred forms and applications of our invention have been described and illustrated, it will be appreciated that modifications and changes may be made therein by those skilled in the art, particularly with our disclosure before them, and thus we do not intend to be limited to the particular disclosure, except insofar as the appended claims are so limited.

We claim:

1. For use in conjunction with an article storage member for holding articles of a type having a rearwardly projecting portion thereon adapted to be engaged by latching means, the improvement comprising, in combination, a socket adapted to receive an article to be held, said socket having an opening to permit a projecting portion on said article to extend rearwardly therethrough, latching means positioned at the rear of said socket for cooperation with said projecting portion, said latching means including a clamp member movable to a closed position to engage said projecting portion and hold an article in said socket and movable to an open position to release said article, spring means for biasing said clamp member toward its closed position, and a trip member adapted when in a first position to hold said clamp member open and having a portion in alignment with said socket opening thereby being adapted to be engaged by the projecting portion on an article inserted in said socket so as to move the trip member to a second position to release said clamp member and permit the latter to be moved to closed position by said spring means.

2. The combination of claim 1 wherein second spring means are provided to yieldingly urge said trip member towards said first position.

3. The combination of claim 2 wherein said clamp member comprises a slidable clamp plate having a generally keyhole shaped opening therein whereby upon insertion of a member to be held in said socket the projecting portion on said member will extend through said keyhole shaped opening and upon movement of said clamp plate to closed position said projecting portion will be prevented from withdrawal through said opening.

4. For use in conjunction with an article storage member for holding articles of a type having a rearwardly projecting portion thereon adapted to be engaged by latching means, the improvement comprising, in combination, a socket adapted to receive an article to be held, said socket having an opening to permit a projecting portion on said article to extend rearwardly therethrough, a housing mounted at the rear of said socket in substantial axial alignment with said socket opening, a trip member comprising a trip plate portion and a shaft portion secured thereto, said shaft being received in a bore in said housing for axial sliding movement therein whereby said trip plate is adapted to move axially towards and away from said socket, a clamp plate adapted to slide in a guide slot in said housing in a direction transverse to the axis of said socket between an open position and a closed position, said clamp plate having an opening therein adapted to be aligned with said socket opening when said clamp plate is in open position to permit a projecting portion on a member mounted in the socket to project therethrough, and said clamp plate being movable to said closed position to prevent withdrawal of said projecting portion, means on said trip plate for projecting into said clamp plate opening when said trip plate is moved towards said socket to hold said clamp plate in open position, said trip plate being engageable by the projecting portion on a member inserted in said socket whereby said trip plate is moved away from said socket to permit said clamp plate to be moved to closed position, means for biasing said clamp plate toward closed position, and means for biasing said trip plate toward said socket.

5. The combination of claim 4 wherein said clamp plate opening comprises a generally keyhole shaped opening including an arcuate flared surface adapted to engage against a frusto-conical shoulder on a projecting portion carried by a member to be held in said socket.

6. The combination of claim 4 wherein said trip plate carries a pair of projecting means, one of said projecting means being adapted to project into said clamp plate opening when said trip plate is moved toward said socket to hold said clamp plate in open position, and the other of said projecting means being adapted to engage said clamp plate to limit the axial movement of said trip plate toward said socket.

7. The combination of claim 4 wherein the means for biasing said clamp plate toward closed position comprises a compression spring positioned transverse to the axis of said socket between said clamp plate and said housing, and wherein the means for biasing said trip plate toward said socket comprises a compression spring housed in a bore in said trip member shaft whereby one end of said spring bears against a rear wall of said housing.

8. A latching mechanism comprising, in combination, a housing having an axial bore extending into the front face thereof, a trip member having a shaft portion slidably received in said bore whereby said trip member is adapted to move forwardly and rearwardly relative to said housing, a clamp member disposed forwardly of said trip member and adapted to slide in a guide slot in said housing in a direction transverse to said bore between an open position and a closed position, said clamp member having an opening therein whereby said clamp member is movable to said open position to permit entry through said opening of a member to be held, and is movable to said closed position to prevent withdrawal of a member to be held, and projecting means on said trip member adapted to project into said clamp opening when said trip member is moved forwardly to hold said clamp member in said open position.

9. The combination of claim 8 wherein first spring means is provided to bias said clamp member toward closed position, and wherein second spring means is provided to bias said trip member forwardly toward said clamp member.

10. The combination of claim 8 wherein said clamp member comprises a slidable clamp plate having a generally keyhole shaped opening therein including an arcuate flared surface adapted to engage against a frusto-conical shoulder on a member to be held.

11. The combination of claim 8 wherein said trip member includes a trip plate having a pair of projecting means, one of said projecting means being adapted to project into said clamp member opening when said trip plate is moved forwardly toward said clamp member to hold the latter in open position, and the other of said projecting means being adapted to engage said clamp member to limit the forward movement of said trip member.

12. In a tool storage matrix of the type utilized in an automatic tool changing system, in combination, a tool holder having a knob projecting rearwardly therefrom, a socket mounted in a tool storage matrix and adapted to receive said tool holder, said socket having an opening to permit said knob to extend rearwardly therethrough when the tool holder is inserted in the socket, a housing mounted at the rear of said socket in substantial axial alignment with said socket opening, a trip member comprising a trip plate portion and a shaft portion secured thereto, said shaft being received in a bore in said housing for axial sliding movement therein whereby said trip plate is adapted to move towards and away from said socket, a clamp plate adapted to slide in a guide slot in said housing in a direction transverse to the axis of said socket, between an open position and a closed position, said clamp plate having an opening therein adapted to be aligned with said socket opening when said clamp plate is in said open posiiton whereby said knob will project therethrough, said clamp plate being movable to said closed posiiton to prevent withdrawal of said knob, means on said trip plate for projecting into said clamp plate opening when said trip plate is moved towards said socket to hold said clamp plate in open position, said trip plate being engageable by said knob when said tool holder is inserted in said socket whereby said trip plate is moved away from said socket to permit said clamp plate to be moved to closed position, means for biasing said clamp plate toward said closed position, and means for biasing said trip plate toward said socket.

References Cited by the Examiner

UNITED STATES PATENTS

| | | | |
|---|---|---|---|
| 838,638 | 12/06 | McKay | 279—86 |
| 1,833,236 | 11/31 | Smith | 279—89 X |
| 2,684,249 | 7/54 | Woytych | 279—93 |
| 2,775,137 | 12/56 | Chung | 287—119 X |
| 2,860,547 | 11/58 | Stephan. | |
| 3,002,365 | 10/61 | Liljequist | 279—86 |
| 3,028,770 | 4/62 | Pittwood. | |
| 3,052,011 | 9/62 | Brainard. | |

FOREIGN PATENTS 1,103,112 10/55 France.

ROBERT C. RIORDON, *Primary Examiner*.

RALPH H. BRAUNER, FRANK SUSKO, *Examiners*.